US012591728B2

(12) United States Patent
Moon et al.

(10) Patent No.: US 12,591,728 B2
(45) Date of Patent: Mar. 31, 2026

(54) METHOD VERIFYING PROCESS PROXIMITY CORRECTION USING MACHINE LEARNING, AND SEMICONDUCTOR MANUFACTURING METHOD USING SAME

(71) Applicant: SAMSUNG ELECTRONICS CO., LTD., Suwon-si (KR)

(72) Inventors: Seorim Moon, Seoul (KR); Bonhyun Gu, Suwon-si (KR); Sooyong Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 733 days.

(21) Appl. No.: 17/903,070

(22) Filed: Sep. 6, 2022

(65) Prior Publication Data

US 2023/0325577 A1 Oct. 12, 2023

(30) Foreign Application Priority Data

Apr. 6, 2022 (KR) ........................ 10-2022-0042811

(51) Int. Cl.
| | |
|---|---|
| *G06F 30/398* | (2020.01) |
| *G03F 1/20* | (2012.01) |
| *G03F 1/70* | (2012.01) |
| *G06F 119/02* | (2020.01) |
| *G06F 119/18* | (2020.01) |

(52) U.S. Cl.
CPC .............. *G06F 30/398* (2020.01); *G03F 1/20* (2013.01); *G03F 1/70* (2013.01); *G06F 2119/02* (2020.01); *G06F 2119/18* (2020.01)

(58) Field of Classification Search
CPC .............. G06F 30/398; G06F 2119/18; G06F 2119/02; G03F 1/20; G03F 1/70
USPC .......... 716/53, 52, 54, 55, 111, 136; 703/14; 378/34, 35; 700/97, 110, 119, 120, 121; 430/4, 5
See application file for complete search history.

(56) References Cited

U.S. PATENT DOCUMENTS

| | | | |
|---|---|---|---|
| 8,762,901 B2 | 6/2014 | Lee et al. | |
| 9,977,856 B2 | 5/2018 | Robles | |
| 10,197,908 B2 | 2/2019 | Sriraman et al. | |
| 10,386,715 B2 | 8/2019 | Wang et al. | |
| 10,691,864 B2 * | 6/2020 | Wang ........................ | G03F 1/36 |
| 10,831,977 B1 * | 11/2020 | Gheith ....................... | G03F 1/36 |
| 11,194,951 B1 * | 12/2021 | Burbine ................... | G03F 1/36 |
| 11,308,256 B2 * | 4/2022 | Wang .................... | G06F 30/398 |

(Continued)

FOREIGN PATENT DOCUMENTS

| | | | | |
|---|---|---|---|---|
| JP | 2006330287 A | * | 12/2006 | .............. G03F 1/36 |
| KR | 10-2007-0101905 A | | 10/2007 | |

(Continued)

*Primary Examiner* — Phallaka Kik
(74) *Attorney, Agent, or Firm* — Fish & Richardson P.C.

(57) ABSTRACT

A method of manufacturing a semiconductor chip includes; generating a layout pattern, performing Process Proximity Correction (PPC) on the layout pattern to generate a PPC layout pattern, wherein the performing of PPC includes verifying the PPC layout pattern using machine learning, performing Optical Proximity Correction (OPC) on the PPC layout pattern to generate an OPC layout pattern, manufacturing a mask using the OPC layout pattern, and manufacturing a semiconductor chip using the mask.

20 Claims, 10 Drawing Sheets

(56) References Cited

U.S. PATENT DOCUMENTS

| | | | |
|---|---|---|---|
| 11,662,657 B2 * | 5/2023 | Tien | G03F 1/70 716/52 |
| 11,714,347 B2 * | 8/2023 | Lee | G03F 1/76 716/53 |
| 11,763,058 B2 * | 9/2023 | Lee | G03F 7/70441 716/53 |
| 11,900,043 B2 * | 2/2024 | Lee | G03F 7/70441 |
| 12,400,144 B2 * | 8/2025 | Chi | G03F 1/36 |
| 2009/0083692 A1 * | 3/2009 | Rieger | G06F 30/39 716/51 |
| 2009/0083693 A1 * | 3/2009 | Rieger | G06F 30/39 716/53 |
| 2018/0300434 A1 * | 10/2018 | Hu | G03F 7/70508 |
| 2019/0109872 A1 * | 4/2019 | Dhakshinamoorthy | G06F 21/577 |
| 2019/0147134 A1 * | 5/2019 | Wang | G06F 30/20 716/52 |
| 2020/0133115 A1 * | 4/2020 | Tien | G03F 1/36 |
| 2020/0320246 A1 * | 10/2020 | Wang | G06F 30/20 |
| 2020/0356011 A1 * | 11/2020 | Su | G06N 20/00 |
| 2021/0334444 A1 * | 10/2021 | Lee | G03F 7/70441 |
| 2022/0035237 A1 * | 2/2022 | Lee | G06F 30/392 |
| 2022/0035337 A1 | 2/2022 | Mcgee et al. | |
| 2022/0100875 A1 * | 3/2022 | Hod | G06F 21/604 |
| 2022/0100935 A1 * | 3/2022 | Chen | G06F 30/27 |
| 2022/0121957 A1 * | 4/2022 | Zhou | G06N 3/084 |
| 2022/0180503 A1 * | 6/2022 | Oh | G06F 18/22 |
| 2022/0327364 A1 * | 10/2022 | Hunsche | G06T 7/0006 |
| 2023/0028712 A1 * | 1/2023 | Lee | G06F 30/27 |
| 2023/0147901 A1 * | 5/2023 | Park | H10B 41/35 257/314 |
| 2023/0206112 A1 * | 6/2023 | Chi | G06N 20/00 716/55 |
| 2024/0090213 A1 * | 3/2024 | Wang | H10B 43/27 |
| 2025/0284202 A1 * | 9/2025 | Huang | G03F 7/70516 |

FOREIGN PATENT DOCUMENTS

| | | | | |
|---|---|---|---|---|
| KR | 1020230016112 A | 2/2023 | | |
| WO | WO-2020169303 A1 * | 8/2020 | | G03F 7/705 |

* cited by examiner

METHOD VERIFYING PROCESS PROXIMITY CORRECTION USING MACHINE LEARNING, AND SEMICONDUCTOR MANUFACTURING METHOD USING SAME

CROSS-REFERENCE TO RELATED APPLICATION

This application claims priority under 35 USC 119 to Korean Patent Application No. 10-2022-0042811 filed on Apr. 6, 2022 in the Korean Intellectual Property Office, the subject matter of which is hereby incorporated by reference in its entirety.

BACKGROUND

The inventive concept relates generally to methods of verifying process proximity correction (PPC) using machine learning, and methods of manufacturing semiconductor chips using such methods of verifying PCC.

Various layout patterns associated with a semiconductor chip may be formed using a variety of processes (e.g., photolithography and etching processes). Once designed, a layout pattern associated with a to-be-fabricated semiconductor chip may be transferred onto a material surface, such as a wafer. That is, a layout pattern associated with a mask may be transferred onto a wafer using photolithography process(es) to form the various patterns on the wafer. However, differences (or defects) may occur between the layout pattern actually transferred onto the wafer and an intended (or originally designed) layout pattern. Such differences may arise due to an optical proximity effect related to a photolithography process or a loading effect associated with an etching process.

In order to more accurately transfer a layout pattern onto the wafer, so-called Process Proximity Correction (PPC) technology has been used to correct defects in a layout pattern. In this regard, PPC technology may be used to predict and analyze an optical proximity effect and/or a loading effect in order to generate an analysis result. And thereafter, the analysis result may be used to correct the layout pattern.

SUMMARY

Embodiments of the inventive concept provide methods of verifying process proximity correction (PPC) in which a weak pattern related to an etching process may be detected by processing big data after performing PPC. Embodiments of the inventive concept also provide methods of manufacturing a mask that use a verified PPC layout pattern, as well as methods of manufacturing a semiconductor chip using such masks.

In some embodiments, the inventive concept provides a method of manufacturing a semiconductor chip including; generating a layout pattern, performing Process Proximity Correction (PPC) on the layout pattern to generate a PPC layout pattern, wherein the performing of PPC includes verifying the PPC layout pattern using machine learning, performing Optical Proximity Correction (OPC) on the PPC layout pattern to generate an OPC layout pattern, manufacturing a mask using the OPC layout pattern, and manufacturing a semiconductor chip using the mask.

In some embodiments, the inventive concept provides a method of manufacturing a semiconductor chip including; performing Process Proximity Correction (PPC) on a layout using first machine learning to generate a PPC layout pattern, and verifying the PPC layout pattern, wherein the verifying of the PPC layout pattern includes; calculating an After Cleaning Inspection (ACI) Critical Dimension (CD) (ACI-CD) using second machine learning, and detecting a weak pattern in the PPC layout pattern in relation to at least one of vertical structure susceptibility, an After Development Inspection (ADI) CD (ADI-CD) variation, and etch loading susceptibility.

In some embodiments, the inventive concept provides a computing device including; a memory device configured to store a Process Proximity Correction Rule Check (PRC) tool, and at least one processor configured to execute the PRC tool, wherein the PRC tool is configured to calculate an After Cleaning Inspection (ACI) Critical Dimension (CD) (ACI-CD) using machine learning, and detect a weak pattern in a Process Proximity Correction (PPC) layout pattern using the ACI-CD.

BRIEF DESCRIPTION OF DRAWINGS

Advantages, benefits and features, as well as the making an use of the inventive concept will be more clearly understood upon consideration of the following detailed description together with the accompanying drawings, in which.

DETAILED DESCRIPTION

Throughout the written description and drawings, like reference numbers and labels are used to denote like or similar elements, components, features and/or method steps.

A semiconductor fabrication method used to manufacture a particular type of semiconductor chip may be understood as a combination of various processes including for example, etching, deposition, planarization, growth and implantation. Etching processes are usually performed by forming a photoresist pattern on a material layer, and then selectively removing portions of the material layer exposed through the photoresist pattern using an etching agent such as chemical(s), gas(es), plasma, radiation (e.g., application of an ion beam), etc.

However, during the performance of an etching process, one or more process error(s) may arise due to a variety of factors that vary in accordance with characteristics of the etching process, characteristics of the photoresist pattern, characteristics of a semiconductor pattern associated with the etching process, etc. Certain process errors due to characteristics of a photoresist pattern may be compensated for by modifying or changing a layout associated with the pattern.

However, as the integration density of contemporary and emerging semiconductor chips increases, and as semiconductor processes become increasing fine in their application, the number of patterns included in a layout has rapidly increased. Accordingly, the computational load required to analyze, correct and/or modify layout pattern in order to compensate for process errors has markedly increased. In view of such increased computational requirements, a Process Proximity Correction (PPC) technique using machine learning has been developed and used during the design and fabrication of semiconductor chips. See, for example, published U.S. Patent Applications 2021-0334444 and 2022-0035237, the collective subject matter of which is hereby incorporated by reference in its entirety.

Figure 1:
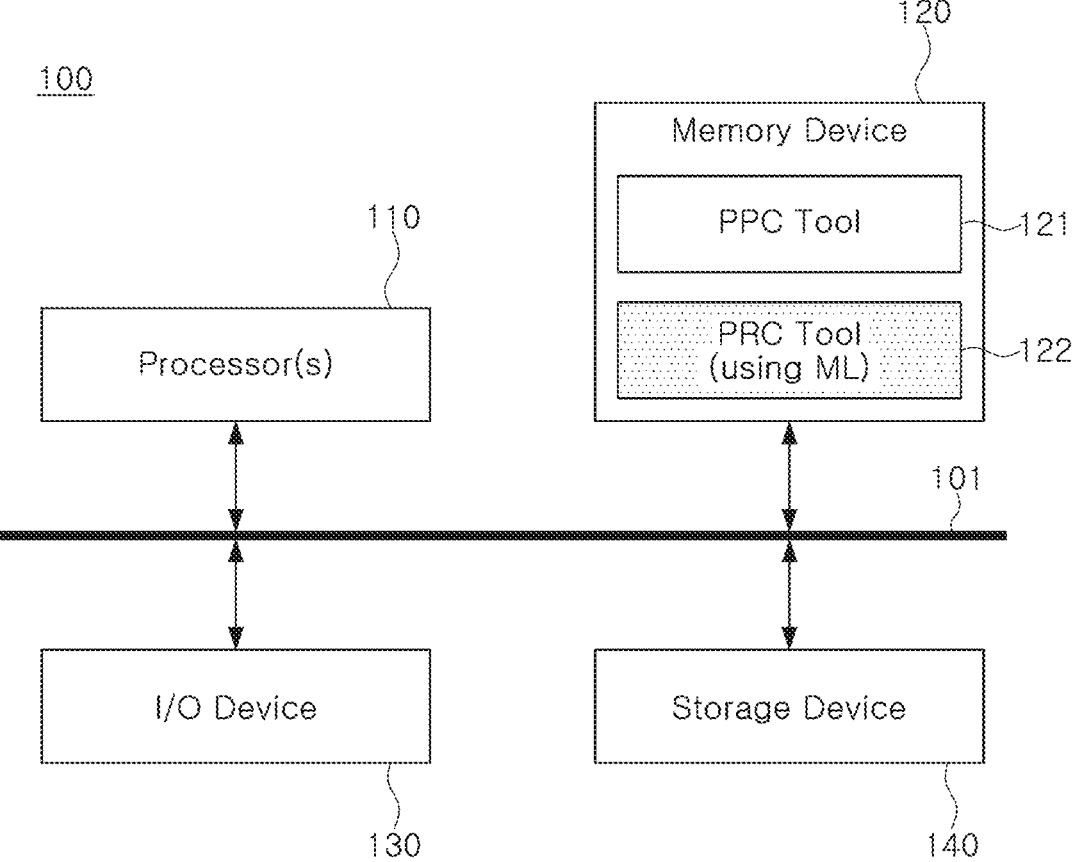
FIG. 1 is a block diagram illustrating a computing device that may be configured to perform PPC according to embodiments of the inventive concept.

FIG. 1 is a block diagram illustrating a computing device 100 that may be configured to perform a PPC Rule Check (PRC) according to embodiments of the inventive concept. Referring to FIG. 1, the computing device 100 may include processor(s) 110, a memory device 120, an input/output (I/O) device 130 and a storage device 140. These components may be variously interconnected using a system bus 101. That is, the processor(s) 110, memory device 120, I/O device 130, and storage device 140 may be electrically connected through the system bus 101 in order to variously exchange data. Those skilled in the art will recognize that the system bus 101 may be variously configured, and may further include mediation features providing efficient data management.

In some embodiments, the computing device 100 may be configured and provided as a stand-alone (or dedicated) device, specifically ascribed to the design of semiconductor devices, performing of a PPC method, and verifying of PPC results. Those skilled in the art will therefore appreciate the computing device 100 may include various design and verification simulation programs.

The processor(s) 110 may be configured to control the overall operation of the computing device 100. Thus, the processor(s) 110 may be configured to execute a sequence of instructions defined in accordance with various software (e.g., applications, operating systems, device drivers). For example, the processor(s) 110 may execute an operating system loaded into the memory device 120, as well as various applications running in relation to the operating system. In some embodiments, the processor(s) 110 may drive a PPC tool 121 and/or a PRC tool 122 loaded into (and read from) the memory device 120. Here, the processor(s) 110 may be implemented using at least one of a central processing unit (CPU), a microprocessor, an application processor (AP), and similar computational logic.

The memory device 120 may be configured to store instructions, the operating system and/or application(s). Upon booting of the computing device, an OS image stored in the storage device 140 may be loaded into the memory device 120 as part of the booting sequence. Overall operation of the computing device 100 may be supported by the operating system.

In some embodiments, one or more applications may be loaded into the memory device 120 that may be selected for execution by a user, or selected form execution by the operating system or another application. That is, various design tool(s) associated with semiconductor design, the PPC tool 121 performing process proximity correction, and the PRC tool 122 using machine learning may be loaded into the memory device 120 from the storage device 140.

In some embodiments, the memory device 120 may include volatile memory (e.g., dynamic random access memory (DRAM) and static random access memory (SRAM)) and/or non-volatile memory (e.g., flash memory, phase change random access memory (PRAM), resistance random access memory (RRAM), Nano Floating Gate Memory (NFGM), Polymer Random Access Memory (PoRAM), Magnetic Random Access Memory (MRAM), and Ferroelectric Random Access Memory (FRAM)).

Design tool(s) may be used to perform various functions associated with the definition or variation of shape(s) and positioning of specific layout patterns differently from those defined by design rule(s). Further, design tool(s) may be used to perform a design rule check (DRC) under the changed bias data conditions.

The PPC tool 121 may be used to perform PPC on the layout pattern in order to generate a "PPC layout pattern"—that is, a corrected layout pattern resulting from the performing of PPC on the layout pattern. Here, the PPC tool 121 may implement PPC functionality using machine learning.

The PRC tool 122 may then be used to perform verification of execution of the PPC (or verification of the PPC layout pattern) in order to generate a "PPC/PRC layout pattern"—that is, a verified, corrected layout pattern resulting from the verifying of the PPC layout pattern. Here, the PRC tool 122 may implement PRC functionality using machine learning.

In some embodiments, the PRC tool 122 may perform PRC in accordance with an After Clean Inspection (ACI) (e.g., an inspection process following an etching process), and a Critical Dimension (CD) variation resulting from an After Development Inspection (ADI) variation. That is, the PRC tool 122 may perform PRC in accordance with a variation in ACI CD related to variation in etch loading. Alternately or additionally, the PRC tool 122 may perform PRC in accordance with an ACI CD variation related to vertical structure variation.

The I/O device 130 may be configured to operate in response to user inputs received through one or more input interface(s), such as a keyboard, a mouse and/or a touch screen, and may provide various information to the user through one or more output interfaces, such as a display, a memory device and/or a printer. Thus, a designer receive and interact with the computing system 100 based on various information related to a semiconductor design, a characteristic of the semiconductor design, a semiconductor layout, a layout pattern, a region of a pattern, a data path, etc. For example, various information related to results provided by operation of the one or more design tool(s), the PPC tool 121, and/or the PRC tool 122 may be visualized and interacted with by a user.

The storage device 140 may generally be provided as storage media accessible by the computing device 100. The storage device 140 may be used to store application(s), program(s), an OS image, various data, etc. The storage device 140 may be variously implemented as a mass storage device, such as a memory card (e.g., MMC, eMMC, SD, Micro SD, etc.), a hard disk drive (HDD), a solid state drive (SSD), a universal flash storage (UFS), etc.

As background consideration related to the inventive concept, it is noted that following introduction of Core-on-Peripheral (COP) process(es) for certain semiconductor chips, so-called High Aspect Ratio Contact (HARC) layers were merged into a single mask. Accordingly, in view of related COP process(es), the number of CD variation(s) due to etching has increased as patterns having deep depth(s) and various lower structure(s) are increasingly required. In order to make corrections in this regard, PPC was introduced and has been used to positive effect. Further in this regard, PPC is able to predict CD value(s) associated with an ACI state, as varies by etching in order to correct ADI-CD to obtain CD consistent with predicted results.

However, the computing device 100 of FIG. 1 additionally performs PRC on the PPC layout pattern in order to detect a weak pattern most materially affected by the process by verifying PPC results using machine learning. Accordingly, the computing device 100 may be used to check process margin(s) and remove process risk.

Figure 2:
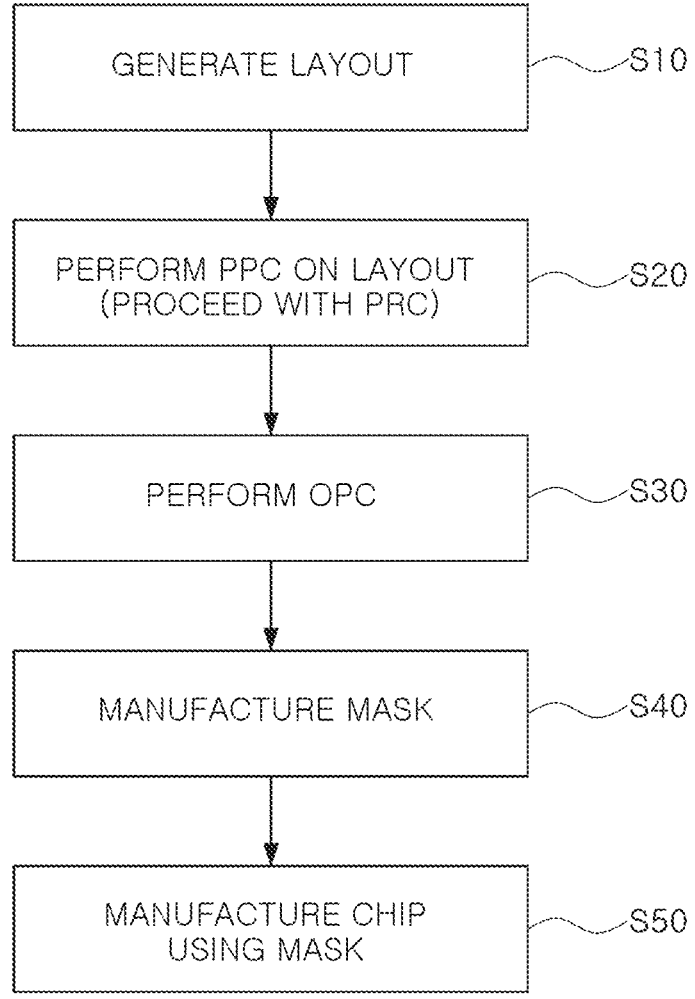
FIG. 2 is a flowchart illustrating a method of manufacturing a semiconductor chip according to embodiments of the inventive concept.

FIG. 2 is a flowchart illustrating a method of manufacturing a semiconductor chip according to embodiments of the inventive concept.

A design layout corresponding to a circuit pattern (or a "layout pattern") associated with a semiconductor chip to-be-formed on a wafer may be generated (e.g., provided from a server or a host computer operatively associated with a semiconductor manufacturing facility) (S10). Here, a layout pattern may be understood is a representation of a physical display by which a circuit (or part of a circuit) designed for a semiconductor chip may be transferred onto a wafer. Of note, a layout pattern may include multiple patterns. In some embodiment, the layout pattern may be expressed as coordinate values defining contours of patterns constituting the design layout from a computer aided design (CAD) system. Some patterns include repeating patterns in which the same shape is repeated. In such cases, the patterns may be provided in the shape of a combination of polygons, such as a triangle or a square.

Once the layout pattern has been generated, PPC may be performed in relation to the layout pattern using machine learning to generate a PPC layout pattern (S20).

In some embodiments, PPC may be rule-based, wherein rule-based PPC may be performed relation to information associated with pattern edges included in the layout pattern, such as widths, lengths, spacings, etc. In other embodiments, PPC may be model-based, wherein model-based PPC may be performed in relation to pixel-based images of the layout pattern. In this regard, model-based PPC may predict a critical dimension by processing an image, and may perform correction according to a corresponding prediction result.

By way of comparison, rule-based PPC performs fewer operations than model-based PPC. Since rule-based PPC uses a lesser amount of information than model-based PPC, the accuracy of rule-based PPC may be lower than that of model-based PPC. However, model-based PPC uses a greater amount of information during operations than rule-based PPC. Accordingly, the accuracy of the model-based PPC may be higher than that of the rule-based PPC, but the computational load associated with model-based PPC may be greater than that of the rule-based PPC.

With the foregoing in mind, the further performing of PRC using machine learning may be desirable.

In some embodiments, an After Cleaning Inspection (ACI) Critical Dimension (CD) (or ACI-CD) may be predicted using machine learning. That is, an ACI-CD variation amount may be calculated in accordance with the After Development Inspection (ADI) CD variation amount. Alternately or additionally, the amount of variation in an ACI-CD may be calculated in accordance with the amount of variation in an etch loading. Alternately or additionally, the ACI-CD variation amount may be calculated in accordance with a vertical structure variation amount.

In some embodiments, a weak pattern may be detected in the PPC layout pattern in relation to an amount of variation between an After Development Inspection (ADI) Critical Dimension (CD) (or ADI-CD) and an ACI-CD, etching load susceptibility, and/or vertical susceptibility. Accordingly, monitoring associated with ADI and/or ACI may be performed in relation to the noted weak pattern. For example, an ACI-CD that is varied by etching may be predicted, and an ADI-CD may be corrected to obtain the predicted ACI-CD.

In some embodiment, after the performing of PPC on the layout pattern to generate the PPC layout pattern, PRC may be performed on the resulting PPC layout pattern in order to further generate a PPC/PRC layout pattern.

Thereafter, an optical proximity correction (OPC) may be performed on either the PPC layout pattern or the PPC/PRC layout pattern (S30). Here, the term "optical proximity correction" denotes a correction process that may material modify or vary one or more aspects of the PPC layout pattern (or the PPC/PRC layout pattern) in relation to certain error(s) caused by an optical proximity effect (OPE). Accordingly, as the layout pattern is refined, an optical proximity phenomenon may occur due to influence(s) between neighboring patterns during various exposure processes. By performing the OPC to correct the PPC layout pattern (or the PPC/PRC layout pattern), undesirable effects associated with OPE may be suppressed. For example, OPC may include expanding a size(s) of certain pattern portion(s) and/or further processing corner portion(s). Alternately or additionally, OPC may include moving edge(s) of various pattern portion(s) and/or adding additional polygons. By performing OPC, distortion phenomena of a layout pattern due to diffraction and interference of light generated during exposure may be corrected, and defects potentially caused by pattern density issues may be corrected.

Of note, OPC may be classified as rule-based OPC or model-based OPC.

Further in this regard, contours associated with a layout pattern may be predicted through simulation by applying mask data to an OPC model. After the performing of OPC, an OPC verification process may be performed.

It follows that once OPC is performed on the PPC layout pattern (or the PPC/PRC layout pattern), an OPC layout pattern is generated.

Thereafter, positioning correction may be additionally performed in relation to the OPC layout pattern. Here, positioning correction essentially moves the relative position of the OPC layout pattern in view of certain physical deformation(s) and modification(s) associated with lower structure(s) and multiple, to-be-aligned patterns. Deformation of the lower structure occurs due to factors related to one or more manufacturing process(es) applied during the fabrication of the semiconductor chip. Accordingly, progressive misalignment may occur in which actual pattern positioning for patterns associated with the lower structure(s) are varied in relation to the layout pattern. Hence, positioning correction may be used to move only such positioning without materially changing the shape of the OPC layout pattern.

The performing of positioning correction and potentially other additional processing, as needed, in relation to the OPC layout pattern may generate a final layout pattern that has been corrected by OPC, positioning correction, etc. The resulting final layout pattern may then be communicated to (e.g.,) an exposure facility associated with the manufacture of mask(s) used during lithographic processes, such as photomasks, electron beam masks, etc. That is, a mask may be manufactured using the OPC corrected layout pattern (S40). For example, after performing OPC, design data obtained through OPC may be communicated as Mask Tape Out (MTO) design data. In this regard, the MTO design data may be understood as mask design data, as corrected by and verified by OPC of the PPC layout pattern (or the PPC/PRC layout pattern).

The MTO design data may be expressed as graphic data having a format compatible with electronic design automation (EDA) software, or the like. For example, the MTO design data may have a data format compatible with such conventionally understood software as GDS and OASIS. After the MTO design data has been communicated, a mask data preparation (MDP) may be performed, wherein MDP may include formatting, conversion, augmentation and verification.

Here, format conversion may be referred to as fracturing, referring to a process of fracturing the MTO design data for each area to be changed into a format for an electron beam exposure machine. For example, fracturing may include data manipulation such as scaling, data sizing, data rotation, pattern reflection, color inversion, and the like. During format conversion, data associated with systematic errors related to the process of converting design data into an image on the wafer may be corrected. In this regard, certain systematic errors may be caused by distortions occurring during exposure, mask development, etching, and wafer imaging.

Accordingly, an exposure process may be performed using a mask that has been manufactured in accordance with a final layout pattern and corresponding design layout data. For example, an exposure process may indicate writing with an electron beam (E-beam). That is, electron beam writing may be performed in a gray writing method using a multi-beam mask writer (MBMW). Alternately or additionally, the electron beam writing may be performed using a Variable Shape Beam (VSB) exposure machine. After performing the exposure process, a related mask may be modified by further performing processes, such as development, etching, cleaning, baking and the like. In some embodiments, before communicating the final layout pattern and/or corresponding design layout data, one or more verification operation(s) may be performed in relation to same.

Ultimately, however, a semiconductor chip may be manufactured using the foregoing mask (S50).

In this regard, the semiconductor chip may be a volatile memory (e.g., a DRAM or a SRAM); a nonvolatile memory (e.g., flash memory); or a logic semiconductor (e.g., a microprocessor, such as a CPU, a controller, an application specific integrated circuit (ASIC) or the like).

In some embodiments, a semiconductor chip may be manufactured by repeatedly performing processes that form additional patterns on a lower structure. Those skilled in the art will further understand that a semiconductor chip may be fully manufactured by performing a sequence of various processes, such as depositions, etchings, ion implantation, cleaning, etc. In this regard, one or more lithography processes—making use of mask(s) manufactured in accordance with embodiments of the inventive concept may be applied. And further in this regard, semiconductor chip manufacturing methods according to embodiments of the inventive concept may be used to identify and analyze a weak pattern in relation to various fabrication processes and further in relation to multiple layers of the semiconductor chip.

Figure 3:
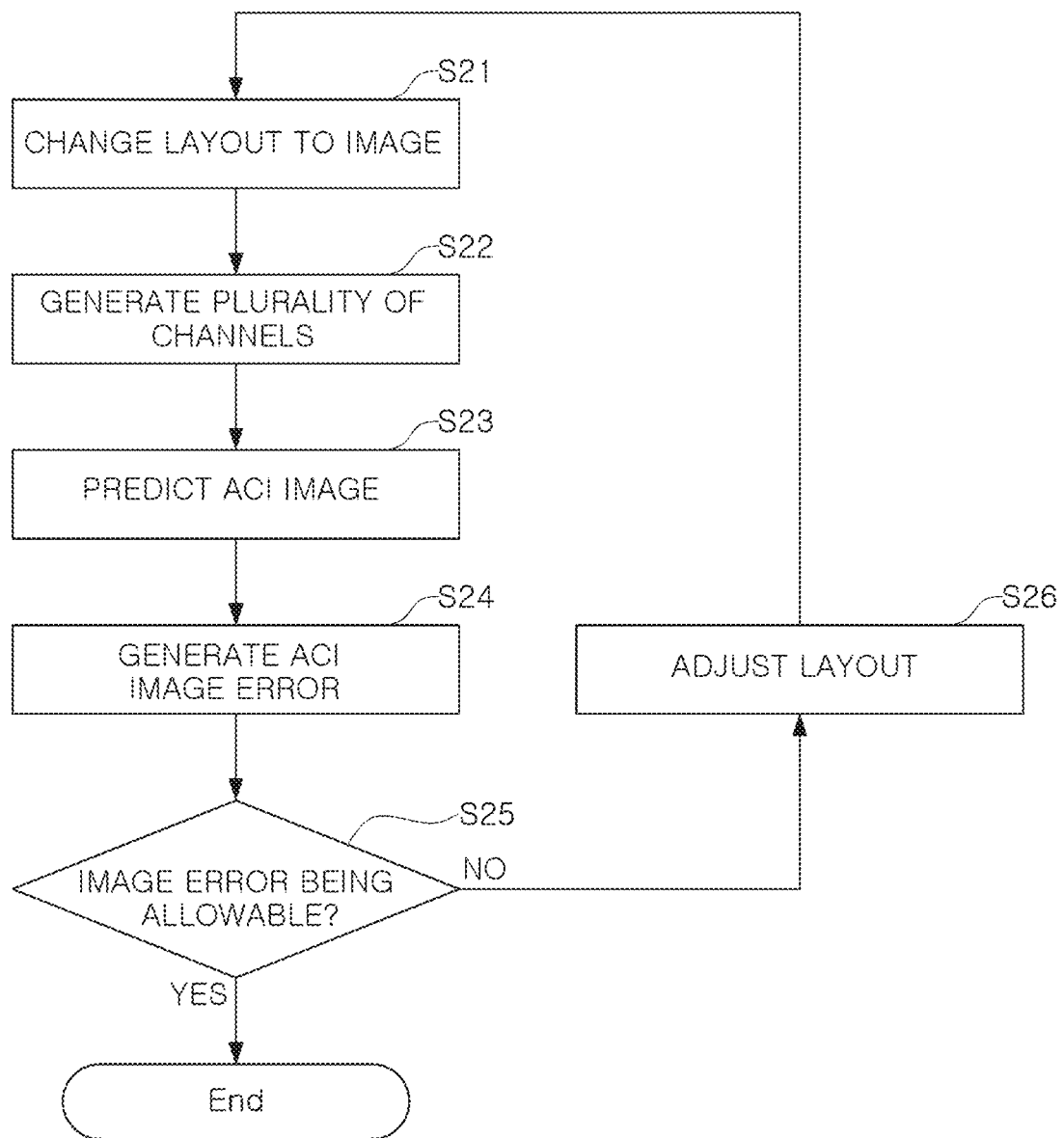
FIG. 3 is a flowchart further illustrating in one example performing of PPC in the method of FIG. 2.

FIG. 3 is a flowchart further illustrating in one example the method step of performing PPC on a layout pattern (S20) in the method of FIG. 2. Here, it is assumed that the method of FIG. 2 is performed using computing device 100 of FIG. 1.

Referring to FIGS. 1, 2 and 3, the processor(s) 110 may drive the PPC tool 121 during the generation of a layout pattern used during the manufacture of a semiconductor chip. In this regard, the processor(s) 110 may perform deep learning after converting the layout pattern into a corresponding image, thereby obtaining a relatively wide range of loading effects through process proximity effect correction.

In some embodiments, when generating a resulting PPC layout pattern, a deep learning network may be used that is configured with a multi-channel according to a length scale for a plurality of patterns associated with the layout pattern. Therefore, consistency and dispersion of various types of contacts (e.g., High Aspect Ratio Contact (HARC)) may be improved. For example, in order to perform PPC on a layout pattern, the processor(s) 110 may convert the layout pattern into a corresponding image (S21). That is, the layout pattern may be expressed as vector data, and the process of converting the layout pattern into the corresponding image may include converting the vector data into corresponding pixel data.

Thereafter, the processor(s) 110 may be used to generate a plurality of input channels that will be applied to machine learning by zooming in/out in relation to a number of magnification settings applied to the image (S22). Alternately, the processor(s) 110 may use the image as an input channel for machine learning without magnification conversion.

Thereafter, the processor(s) 110 may be used to predict an ACI image corresponding to the image using machine learning (S23). In some embodiments, the ACI image may be predicted using a Convolutional Neural Network (CNN), but the scope of the inventive concept is not limited thereto, and the ACI image may alternately be predicted using, for example, a Generative Adversarial Network (GAN) or an Artificial Neural Network (ANN).

After performing machine learning, the processor(s) 110 may be used to generate an ACI image error value by comparing the predicted AIC image with at least a portion of the image (e.g., a target value) (S24). Thereafter, the processor(s) 110 may determine whether the generated ACI image error value falls within an acceptable range (S25).

If the ACI image error value does not fall within the acceptable range (S25=NO), the PPC layout pattern may be adjusted using the ACI image error value (S26) and the method returns to method step S21.

Accordingly, the PPC tool 122 may be used to adjust layout pattern characteristics (e.g., pattern sizes and/or shapes). As the layout pattern's characteristics are adjusted, characteristics of neighboring patterns may be updated. In some embodiments, adjustment of features may be performed using machine learning-based inferences. For example, the PPC tool 122 may determine adjustment values for features by performing machine learning inference on a difference between an inferred ACI image and the target ACI image. The PPC tool 122 may perform inference for each of a number of layout patterns individually, or in groups of layout patterns (or related images).

Once the ACI image error value is deemed acceptable (S25=YES), the step of performing PPC is complete (END).

Figure 4A:
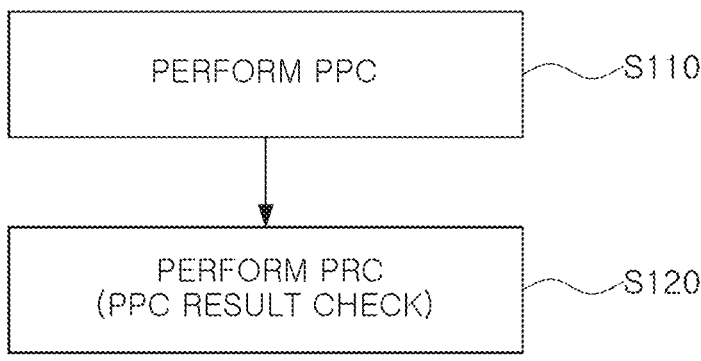
FIG. 4A is a flowchart further illustrating in one performing of PPC according to embodiments of the inventive concept.

FIG. 4A is a flowchart illustrating a method of operating the computing device 100 of FIG. 1 according to embodiments of the inventive concept.

Referring to FIGS. 1 and 4A, the processor(s) 110 of the computing device 100 may perform PPC on the layout pattern by driving the PPC tool 121 (S110). In this case, the PPC tool 121 may be performed using first machine learning. In some embodiments, the PPC layout may be adjusted when predicting an ACI image and determining whether or not the predicted ACI image falls within an acceptable error range.

The processor(s) 110 may than verify the PPC layout pattern by driving the PRC tool 122 (S120). In this case, the PRC tool 122 may be performed using second machine learning. In some embodiments, an ACI-CD may be calculated for all contacts in the full-chip using the second machine learning. In some embodiments, each of the first machine learning and the second machine learning uses deep learning. And in some embodiments, a detected weak pattern may be monitored.

Figure 4B:
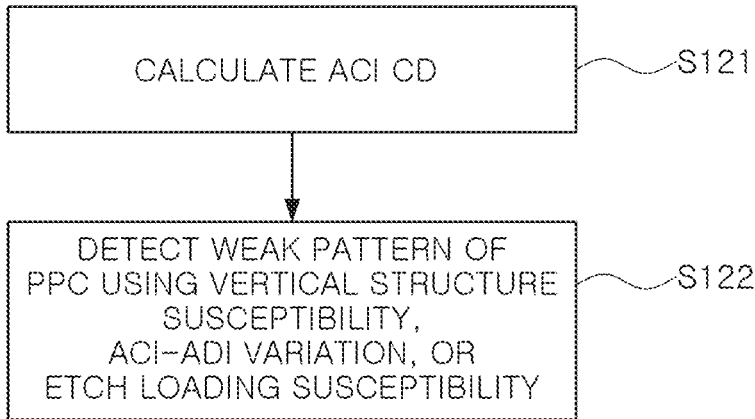
FIG. 4B is a flowchart further illustrating in one an example performing PRC in the method of FIG. 4A.

FIG. 4B is a flowchart further illustrating in one example the performing of the PRC operation (S120) in the method of FIG. 4A.

Referring to FIGS. 1 to 4B, the performing of PRC may include the processor(s) 110 calculating an ACI-CD using machine learning (S121). Thereafter, the processor(s) 110 may detect a weak pattern included in the PPC layout pattern in relation to a vertical structure, an ACI-ADI variation or an etch loading (S122).

Figure 5:
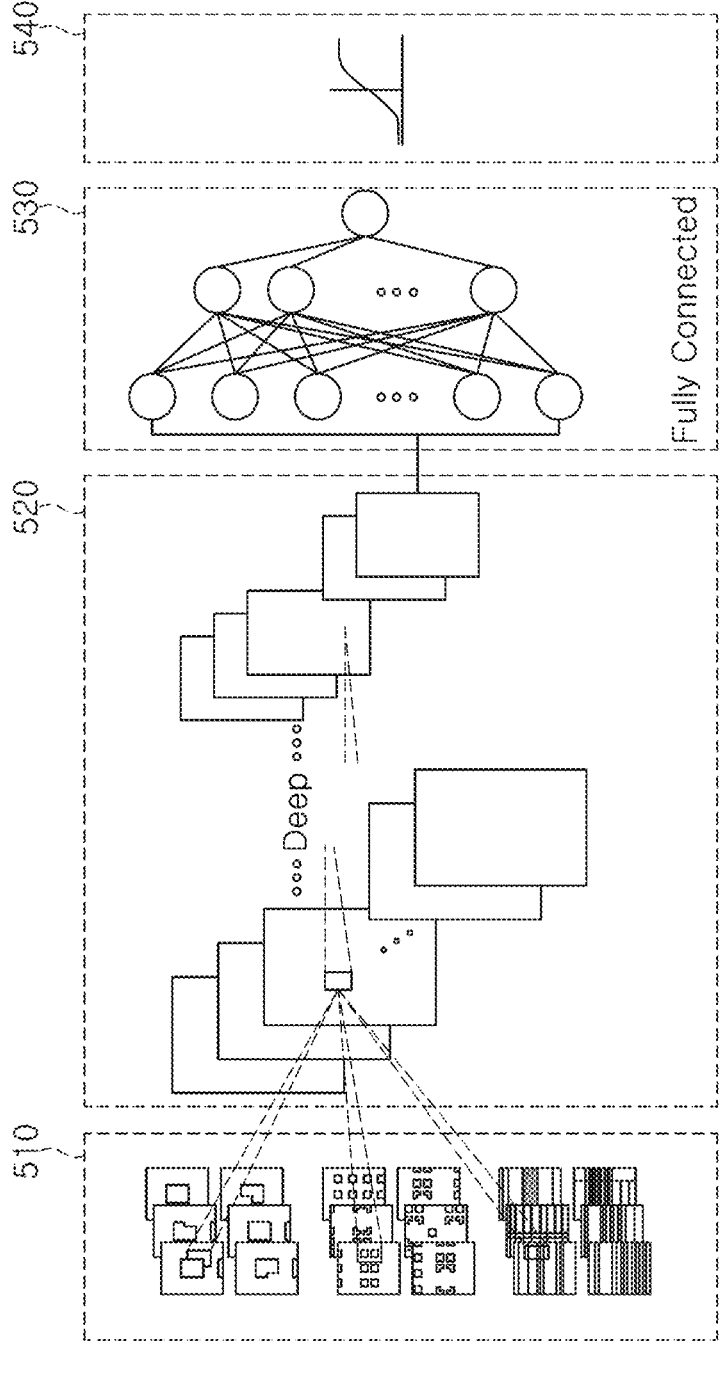
FIG. 5 is a conceptual diagram illustrating in one example the calculating of an ACI-CD variation using machine learning according to embodiments of the inventive concept.

FIG. 5 is a conceptual diagram illustrating in one example the calculating of an ACI-CD variation using machine learning according to embodiments of the inventive concept.

Machine learning may include a plurality of convolutional layers, a fully connected layer processing the output of the convolutional layers, and the like. Each of the convolutional layers may include a convolution module, a sub-sampling module, and the like. The convolution module may apply one or more kernels to the input feature map to execute a convolution operation, and apply an activation function such as ReLU or the like to the results of the convolution operation in order to change values of the feature map into non-linear values. The sub-sampling module may perform sub-sampling to reduce the size of the feature map output by the convolution module. Here, the sub-sampling module may also be defined as a pooling module.

in some embodiments, operations such as max pooling for selecting a maximum value from the feature map, average pooling for calculating an average from values of the feature map, and the like, may be performed. Input image data 510 applied to convolutional layers 520 may correspond to images converted from layout pattern data. The input image data may include a target layout pattern to-be-formed by a semiconductor process performed using the layout pattern data, and at least one peripheral pattern adjacent to the target pattern. The feature map output by the convolutional layers may be applied to a fully connected layer 530. Here, an output value 540 of the fully connected layer may be a predicted value with respect to a critical dimension of the target layout pattern included as part of the input image data. In this regard, the predicted value may be a critical dimension of the expected target layout pattern when the target pattern is actually formed by performing a semiconductor process using the layout pattern data.

ACI-CD calculation may be required for all contacts in about 45 million full-chip using machine learning. After completion of PPC and in response to the ADI-CD for all generated contacts, a variation amount for the finally-predicted ACI-CD in accordance with a variation in respective factors (e.g., vertical structure, ACI-ADI variation amount(s), etch loading, etc.) may be calculated. The greater the amount of variation, the greater the influence associated with each factor. For example, a weak pattern having a greatest influence on the process may be detected. By verifying detected patterns, process margins may be checked and manufacturing risks may be eliminated.

Figure 6:
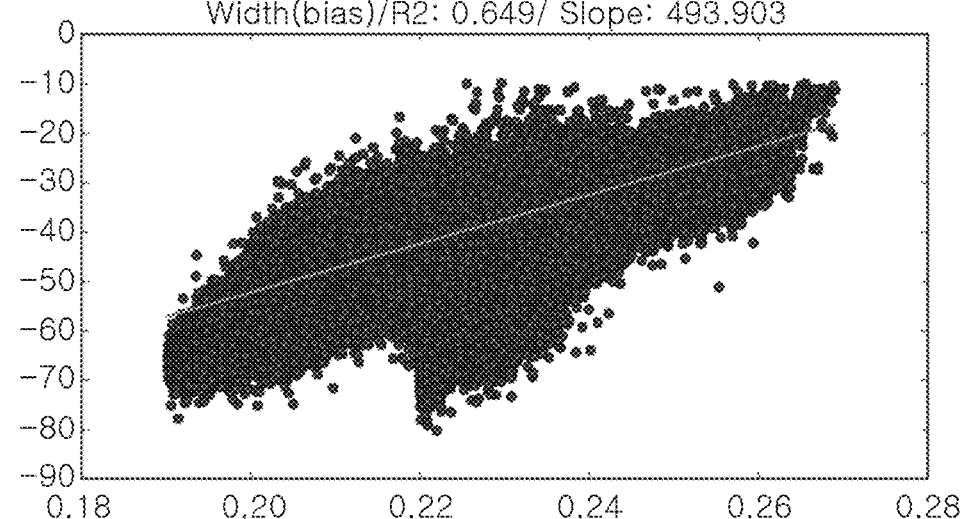
FIG. 6 is a graph illustrating in one example ACI-CD variation in relation to ADI-CD variation according to embodiments of the inventive concept.

FIG. 6 is a graph illustrating in one example ACI-CD variations according to ADI-CD variations according to embodiments of the inventive concept. Referring to FIG. 6, when shaking at ±10 nm based on the corrected ADI-CD in the PPC result, a pattern with a relatively large amount of variation in the predicted ACI-CD may be extracted. It follows that this becomes a metric for a weak pattern in which a photo-etch process skew is reflected.

Figure 7:
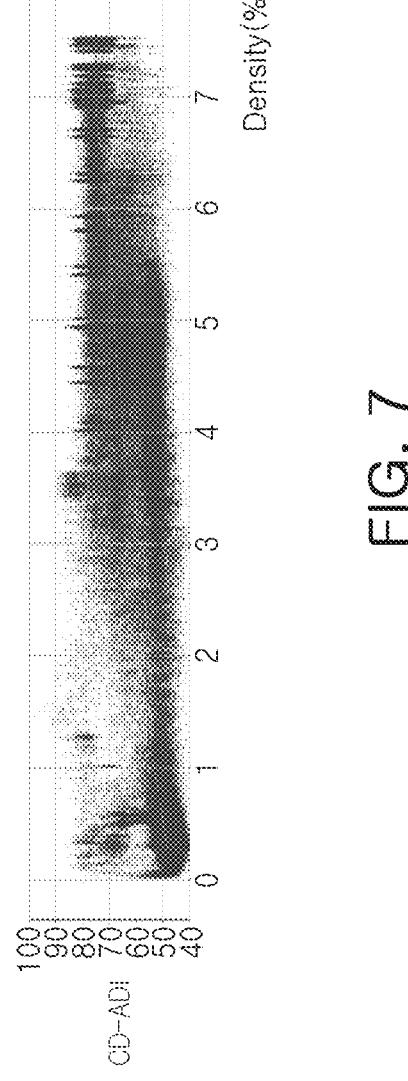
FIG. 7 is a graph illustrating in one example ACI-CD variation in relation to etch loading variation according to embodiments of the inventive concept.

FIG. 7 is a graph illustrating in one example ACI-CD variation as a function of etch loading variation according to embodiments of the inventive concept. Referring to FIG. 7, after shaking the etch loading variation by ±10%, a weak pattern with a relatively large variation amount of predicted ACI-CD may be extracted. Since it is affected differently depending on the layout pattern density after the etching process, it follows that this becomes a metric to identify the weak pattern most affected by the etching loading.

Further in this regard, loading susceptibility (LS) may satisfy the following equation:

$$\text{Loading Susceptibility } (LS) = \frac{\Delta CD}{\Delta \text{Loading}} = \frac{CD@110\% - CD@90\%}{\text{Loading} * 110\% - \text{Loading} * 90\%}, \qquad \text{[Equation 1]}$$

wherein the loading susceptibility LS is a value indicating an amount of variation in the critical dimension according to an amount of loading variation. Referring to Equation 1, the loading susceptibility LS may be defined as a value obtained by dividing a first difference value between a critical dimension of 110% and a critical dimension of 90% by a second difference value between a loading of 110% and a loading of 90%.

Figure 8:
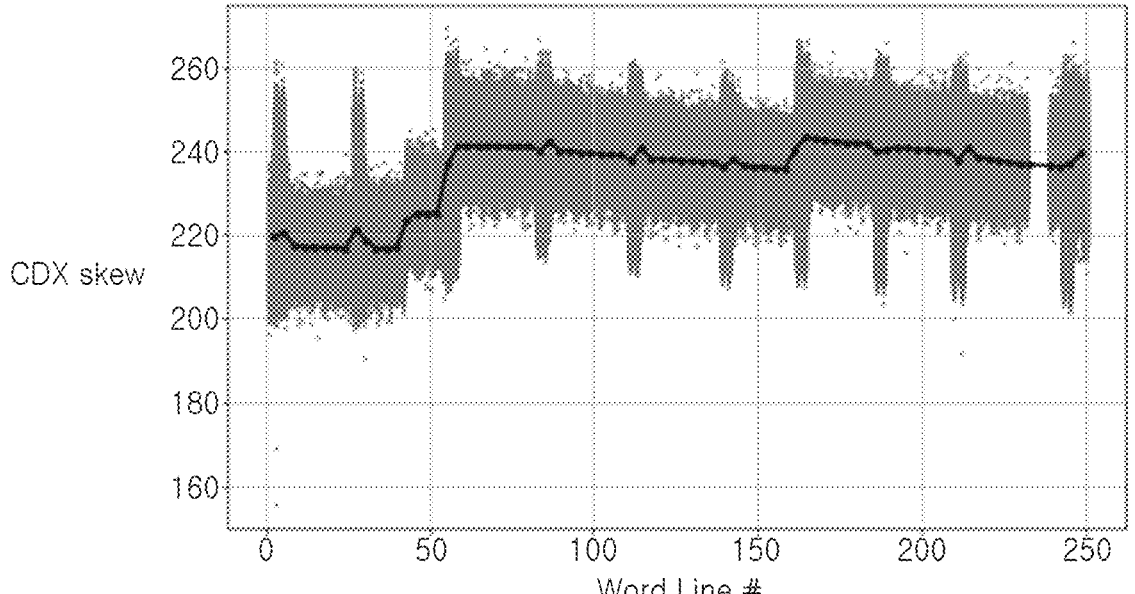
FIG. 8 is a graph illustrating in one example ACI-CD variation in relation to vertical structure variation according to embodiments of the inventive concept.

FIG. 8 is a graph illustrating in one example an ACI-CD variation in accordance with a vertical structure variation according to embodiments of the inventive concept. Referring to FIG. 8, after shaking the lower structure by +1 stage, a weak pattern with a relatively large amount of predicted ACI-CD variation may be extracted. It follows that this becomes a metric to identify the weak pattern that is most affected by variations in the lower structure.

Further in this regard, vertical susceptibility VS may satisfy the following equation:

$$\text{Vertical Susceptibility } (VS) = \frac{\Delta CD}{\Delta \text{Vertical } WL} = \frac{CD@WL + 1 - CD@WL}{WL + 1}, \qquad \text{[Equation 2]}$$

wherein the vertical susceptibility LS is a value indicating an amount of variation in the critical dimension according to an amount of variation in the vertical word line. Referring to Equation 2, the vertical susceptibility VS may be understood as a value obtained by dividing a difference value of the critical dimension between the word lines in the vertical position of stage 1 by the depth of the word line of stage 1.

Figure 9:
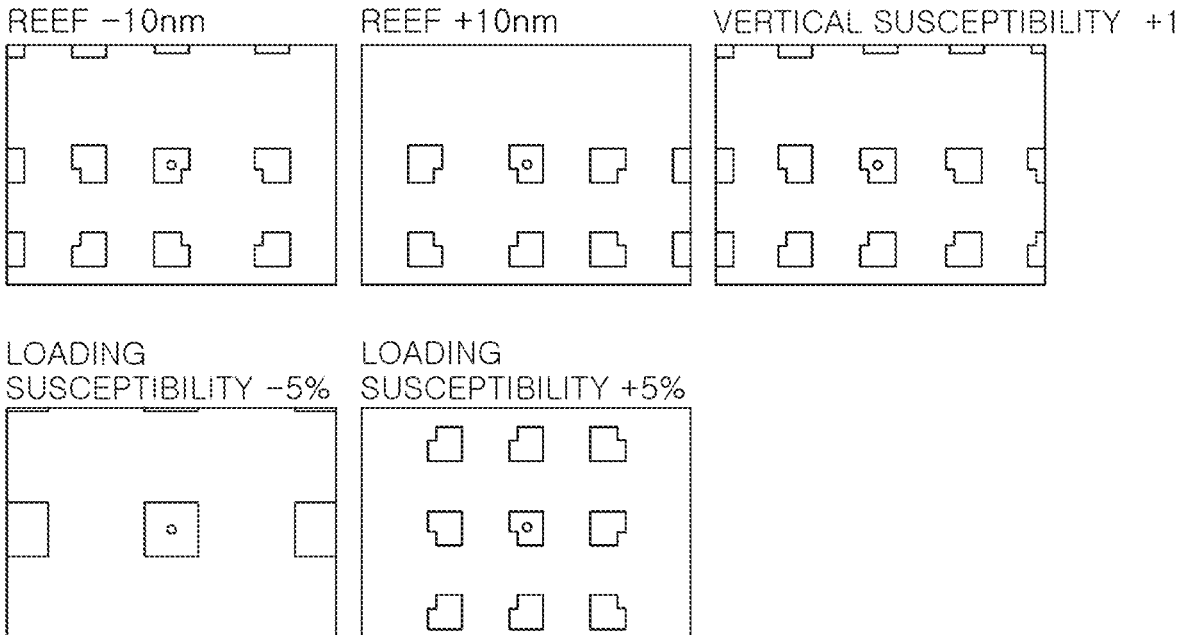
FIG. 9 is a conceptual diagram illustrating in one example PRC results according to embodiments of the inventive concept.

FIG. 9 is a conceptual diagram illustrating in one example a PRC result according to embodiments of the inventive concept. Here, the pattern most affected by the process may be detected in accordance with applied PPC results (e.g., the PPC layout pattern), and the detected pattern may be verified. Accordingly, the weakest pattern relative to the process with respect to all layers to which PPC results are applied may be detected. In addition, big data may be processed by calculating all patterns in the full-chip using machine learning. Thus, as illustrated in FIG. 9, patterns most significantly affected by the final process may be detected.

Alternately, a chip-to-chip (C2C) structure may be implemented using the PPC verification method and the foregoing mask manufacturing method according to embodiments of the inventive concept.

Figure 10:
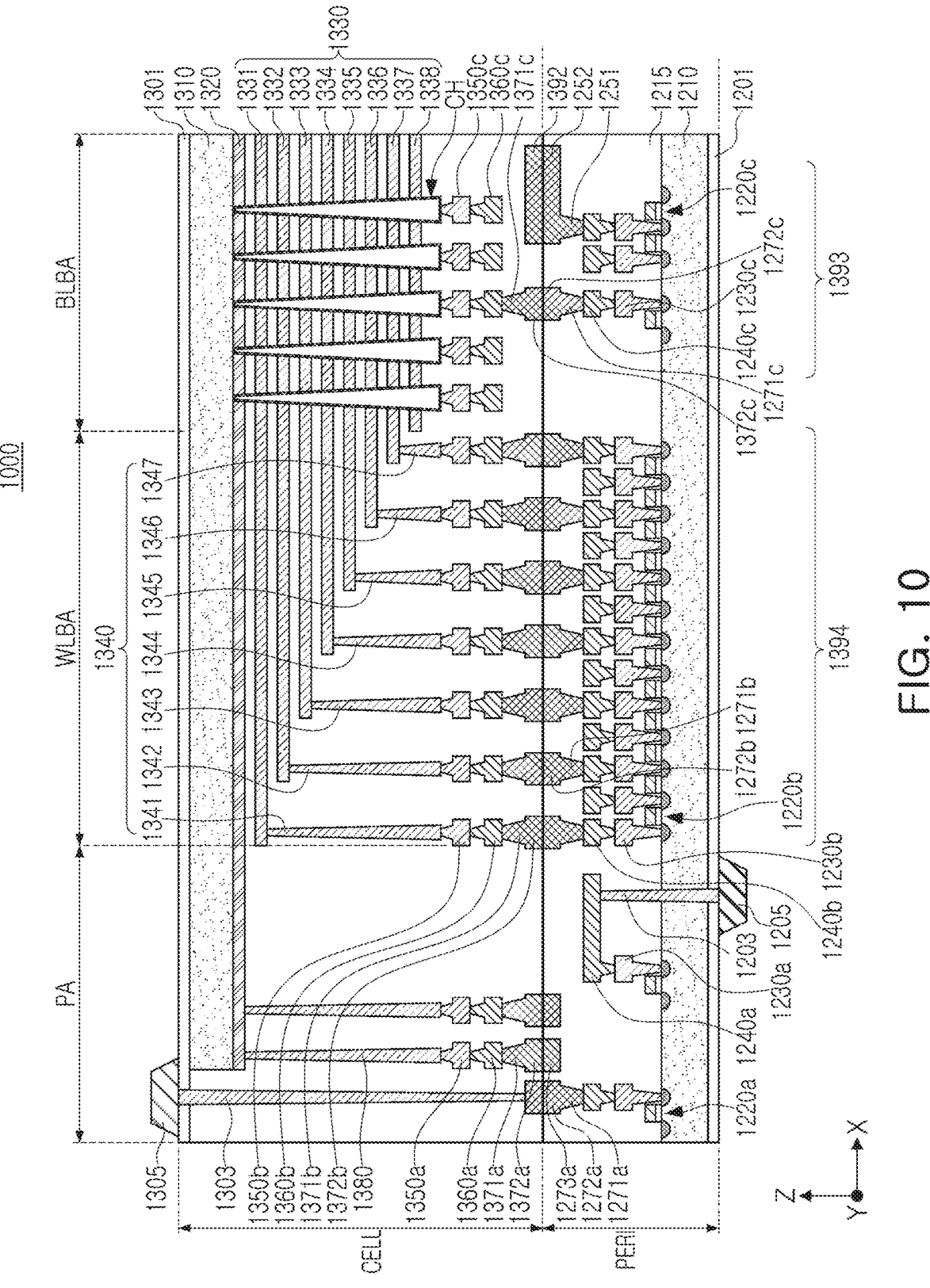
FIG. 10 is a cross-sectional diagram illustrating in one example a nonvolatile memory device implemented in a C2C structure according to embodiments of the inventive concept.

FIG. 10 is a cross-sectional diagram illustrating an exemplary nonvolatile memory device 1000 implemented in a C2C structure according to embodiments of the inventive concept. The C2C structure may refer to manufacturing an upper chip including a cell area (CELL) on a first wafer, fabricating a lower chip including a peripheral circuit area PERI on a second wafer different from the first wafer, and then, connecting the upper chip and the lower chip to each other by bonding. For example, the bonding method may be a method of electrically connecting the bonding metal formed in an uppermost metal layer of the upper chip and the bonding metal formed in an uppermost metal layer of the lower chip to each other. In an example embodiment, when the bonding metal is formed of copper (Cu), the bonding method may be a Cu-to-Cu bonding method. In another embodiment, the bonding metal may be formed of aluminum (Al) or tungsten (W).

Each of the peripheral circuit area PERI and the cell area CELL of the nonvolatile memory device 1000 may include an external pad bonding area PA, a word line bonding area WLBA, and a bit line bonding area BLBA.

The peripheral circuit area PERI may include a first substrate 1210, an interlayer insulating layer 1215, a plurality of circuit elements 1220a, 1220b and 1220c formed on the first substrate 1210, first metal layers 1230a, 1230b and 1230c connected to the plurality of circuit elements 1220a, 1220b and 1220c, respectively, and second metal layers 1240a, 1240b and 1240c formed on the first metal layers 1230a, 1230b and 1230c. In some embodiments, the first metal layers 1230a, 1230b, and 1230c may be formed of tungsten having a relatively high specific resistivity. In some embodiments, the second metal layers 1240a, 1240b, and 1240c may be formed of copper having a relatively low specific resistivity.

FIG. 10 illustrates, first metal layers 1230a, 1230b, and 1230c and second metal layers 1240a, 1240b, and 1240c, but the scope of the inventive concept is not limited thereto. At least one metal layer may be further formed on the second metal layers 1240a, 1240b, and 1240c. At least a portion of the one or more metal layers formed on the second metal layers 1240a, 1240b, and 1240c may be formed of aluminum having a specific resistance different from that of copper forming the second metal layers 1240a, 1240b, 1240c.

In some embodiments, the interlayer insulating interlayer 1215 may be disposed on the first substrate 1210 to cover the plurality of circuit elements 1220a, 1220b, and 1220c, the first metal layers 1230a, 1230b, and 1230c, and the second metal layers 1240a, 1240b, and 1240c. In some embodiments, the interlayer insulating layer 1215 may include an insulating material such as silicon oxide or silicon nitride.

Lower bonding metals 1271b and 1272b may be formed on the second metal layer 1240b of the word line bonding area WLBA. In the word line bonding area WLBA, the lower bonding metals 1271b and 1272b of the peripheral circuit area PERI may be electrically connected to the upper bonding metals 1371b and 1372b of the cell area CELL by a bonding method. In some embodiments, the lower bonding metals 1271b and 1272b and the upper bonding metals 1371b and 1372b may be formed of aluminum, copper, tungsten, or the like. Additionally, the upper bonding metals 1371b and 1372b of the cell area CELL may be referred to as first metal pads, and the lower bonding metals 1271b and 1272b may be referred to as second metal pads.

The cell area CELL may include at least one memory block. In some embodiments, the cell area CELL may include a second substrate 1310 and a common source line 1320. A plurality of word lines 1331 to 1338; 1330 may be stacked on the second substrate 1310 in a direction (Z-axis direction) perpendicular to the upper surface of the second substrate 1310. In some embodiments, string selection lines and ground selection lines may be disposed above and below the word lines 1330, respectively. In an example embodiment, a plurality of word lines 1330 may be disposed between the string selection lines and the ground selection line.

In the bit line bonding area BLBA, the channel structure CH extends in a direction (Z-axis direction) perpendicular to the upper surface of the second substrate 1310 to pass through the word lines 1330, the string selection lines, and the ground selection line. The channel structure CH may include a data storage layer, a channel layer, a buried insulating layer, and the like, and the channel layer may be electrically connected to a first metal layer 1350c and a second metal layer 1360c. For example, the first metal layer 1350c may be a bit line contact, and the second metal layer 1360c may be a bit line. In an example embodiment, the bit line 1360c may extend in a first direction (Y-axis direction) parallel to the upper surface of the second substrate 1310.

As illustrated in FIG. 10, an area in which the channel structure CH and the bit line 1360c are disposed may be defined as the bit line bonding area BLBA. In some embodiments, the bit line 1360c may be electrically connected to the circuit elements 1220c providing a page buffer 1393 in the peripheral circuit area PERI in the bit line bonding area BLBA. For example, the bit line 1360c may be connected to the upper bonding metals 1371c and 1372c in the peripheral circuit area PERI. In this case, the upper bonding metals 1371c and 1372c may be connected to the lower bonding metals 1271c and 1272c connected to the circuit elements 1220c of the page buffer 1393. In the word line bonding area WLBA, the word lines 1330 may extend in a second direction (X-axis direction) perpendicular to the first direction and parallel to the upper surface of the second substrate 1310. In some embodiments, the word line bonding area WLBA may be connected to a plurality of cell contact plugs 1341-1347; 1340. For example, the word lines 1330 and the cell contact plugs 1340 may be connected to each other through pads provided by at least some of the word lines 1330 extending in different lengths in the second direction. In some embodiments, the first metal layer 1350b and the second metal layer 1360b may be sequentially connected to upper portions of the cell contact plugs 1340 connected to the word lines 1330. In some embodiments, the cell contact plugs 1340 may be connected to the peripheral circuit area PERI through the upper bonding metals 1371*b* and 1372*b* of the cell area CELL and the lower bonding metals 1271*b* and 1272*b* of the peripheral circuit area PERI in the word line bonding area WLBA.

In some embodiments, the cell contact plugs 1340 may be electrically connected to the circuit elements 1220*b* providing a row decoder 1394 in the peripheral circuit area PERI. In some embodiments, the operating voltages of the circuit elements 1220*b* providing the row decoder 1394 may be different from the operating voltages of the circuit elements 1220*c* providing the page buffer 1393. For example, the operating voltages of the circuit elements 1220*c* providing the page buffer 1393 may be greater than the operating voltages of the circuit elements 1220*b* providing the row decoder 1394.

A common source line contact plug 1380 may be disposed in the external pad bonding area PA. In some embodiments, the common source line contact plug 1380 may be formed of a conductive material, such as a metal, a metal compound, or polysilicon. The common source line contact plug 1380 may be electrically connected to the common source line 1320. A first metal layer 1350*a* and a second metal layer 1360*a* may be sequentially stacked on the common source line contact plug 1380. For example, an area in which the common source line contact plug 1380, the first metal layer 1350*a*, and the second metal layer 1360*a* are disposed may be defined as the external pad bonding area PA. The second metal layer 1360*a* may be electrically connected to the upper metal via 1371*a*. The upper metal via 1371*a* may be electrically connected to the upper metal pattern 1372*a*.

Alternately, I/O pads 1205 and 1305 may be disposed in the external pad bonding area PA. Referring to FIG. 10, a lower insulating layer 1201 covering a lower surface of the first substrate 1210 may be formed on a lower portion of the first substrate 1210. Also, a first I/O pad 1205 may be formed on the lower insulating layer 1201. In some embodiments, the first I/O pad 1205 may be connected to at least one of the plurality of circuit elements 1220*a*, 1220*b*, and 1220*c* disposed in the peripheral circuit area PERI through the first I/O contact plug 1203. In some embodiments, the first I/O pad 1205 may be separated from the first substrate 1210 by the lower insulating layer 1201. Also, a side insulating layer is disposed between the first I/O contact plug 1203 and the first substrate 1210 to electrically isolate the first I/O contact plug 1203 from the first substrate 1210.

Referring to FIG. 10, an upper insulating layer 1301 covering an upper surface of the second substrate 1310 may be formed on the second substrate 1310. Also, a second I/O pad 1305 may be disposed on the upper insulating layer 1301. In some embodiments, the second I/O pad 1305 may be connected to at least one of the plurality of circuit elements 1220*a*, 1220*b*, and 1220*c* disposed in the peripheral circuit area PERI through a second I/O contact plug 1303, a lower metal pattern 1272*a*, and a lower metal via 1271*a*.

In some embodiments, the second substrate 1310, the common source line 1320 and the like may not be disposed in the region in which the second I/O contact plug 1303 is disposed. Also, the second I/O pad 1305 may not overlap the word lines 1380 in the third direction (Z-axis direction). The second I/O contact plug 1303 may be separated from the second substrate 1310 in a direction parallel to the upper surface of the second substrate 1310. Also, the second I/O contact plug 1303 may pass through the interlayer insulating layer 1315 of the cell area CELL to be connected to the second I/O pad 1305. In an example embodiment, the second I/O pad 1305 may be electrically connected to the circuit element 1220*a*.

In some embodiments, the first I/O pad 1205 and the second I/O pad 1305 may be selectively formed. For example, the nonvolatile memory device 1000 may include only the first I/O pad 1205 disposed on the first substrate 1201, or may include only the second I/O pad 1305 disposed on the second substrate 1301. In other embodiments, the nonvolatile memory device 1000 may include both the first I/O pad 1205 and the second I/O pad 1305.

In each of the external pad bonding area PA and the bit line bonding area BLBA included in each of the cell area CELL and the peripheral circuit area PERI, the metal pattern of the uppermost metal layer is present as a dummy pattern, or the uppermost metal layer may be empty.

In the nonvolatile memory device 1000 of FIG. 10, in the external pad bonding area PA, a lower metal pattern 1273*a* having the same shape as an upper metal pattern 1372*a* of the cell area CELL may be formed on the uppermost metal layer of the peripheral circuit area PERI, to correspond to the upper metal pattern 1372*a* formed on the uppermost metal layer of the cell region CELL. The lower metal pattern 1273*a* formed on the uppermost metal layer of the peripheral circuit area PERI may not be connected to a separate contact in the peripheral circuit area PERI. Similarly, in the external pad bonding area PA, an upper metal pattern having the same shape as the lower metal pattern of the peripheral circuit area PERI may be formed on the upper metal layer of the cell region CELL, to correspond to the lower metal pattern formed on the uppermost metal layer of the peripheral circuit region PERI.

Lower bonding metals 1271*b* and 1272*b* may be formed on the second metal layer 1240*b* of the word line bonding area WLBA. In the word line bonding area WLBA, the lower bonding metals 1271*b* and 1272*b* of the peripheral circuit area PERI may be electrically connected to the upper bonding metals 1371*b* and 1372*b* of the cell area CELL by a bonding method.

Also, lower bonding metals 1251 and 1252 may be formed on the metal layer of the bit line bonding area BLBA. In the bit line bonding area BLBA, an upper metal pattern 1392 having the same shape as the lower metal pattern 1252 of the peripheral circuit area PERI may be formed on the uppermost metal layer of the cell area CELL, to correspond to the lower metal pattern 1252 formed on the uppermost metal layer of the peripheral circuit area PERI.

In some embodiments, corresponding to the metal pattern formed on the uppermost metal layer of one of the cell area CELL and the peripheral circuit area PERI, a reinforced metal pattern having the same cross-sectional shape as the formed metal pattern may be formed on the uppermost metal layer of the other one of the cell area CELL and the peripheral circuit area PERI. Contacts may not be formed in the reinforced metal pattern.

In methods of manufacturing a semiconductor chip according to embodiments of the inventive concept, a PPC Result Check (PRC) may be performed. For example, a weak pattern in relation to the etch process may be identified using machine learning applied to big data processing performing PPC. Further, an expected ACI-CD may be calculated in relation to NGR measurement data and an ADI target following PPC, wherein a pattern having the greatest amount of variation following PPC in relation to a vertical structure, an ACI-ADI variation amount, and/or etch loading effects may be identified. Accordingly, PPC results may be verified and PPC weak patterns may be ADI/ACI monitored.

Of note, semiconductor chip manufacturing methods according to embodiments of the inventive concept may be used to verify results obtained through machine learning PPC. For example, a semiconductor chip manufacturing method may verify PPC results using three (3) metrics (e.g., REEF, Loading Susceptibility, and Vertical Susceptibility). In some embodiments, PPC may be calculated for all patterns in a full-chip. A pattern weak in relation to the process may be predicted by finding a pattern having a large amount of variation by each term.

The various components described above in relation to embodiments of the inventive concept may be understood as including one or more "blocks". Here, such blocks may be implemented in hardware (e.g., as Integrated Circuit (IC), Application Specific IC (ASIC), Field Programmable Gate Array (FPGA), Complex Programmable Logic Device (CPLD), etc.), firmware running on one or more hardware device(s), and/or software (e.g., one or more application(s). In addition, the blocks may include circuits include semiconductor elements associated with an IC or related circuitry registered as Intellectual Property (IP).

As set forth above, embodiments of the inventive concept provide process proximity correction verification methods that may be used during the manufacture of a mask that is used to manufacture a semiconductor chip. Such methods may be used to identify and verify a weak pattern using machine learning following process proximity correction.

Further, embodiments of the inventive concept provide process proximity correction verification methods that may be used during the manufacture of a mask used to manufacture a semiconductor chip. Such methods may be used to significantly reduce variation in a Critical Dimension (CD) due to etching by performing an etching process verification.

While certain embodiments of the inventive concept have been illustrated and described above, those skilled in the art will appreciate that various modifications and may be made to same without departing from the scope of the inventive concept as defined by the following claims.

What is claimed is:

1. A method of manufacturing a semiconductor chip, the method comprising:
   generating a layout pattern;
   performing Process Proximity Correction (PPC) on the layout pattern to generate a PPC layout pattern;
   verifying the PPC layout pattern, wherein verifying the PPC layout pattern comprises calculating a metric using machine learning and comparing the calculated metric to a stored metric;
   performing Optical Proximity Correction (OPC) on the PPC layout pattern to generate an OPC layout pattern;
   manufacturing a mask using the OPC layout pattern; and
   manufacturing a semiconductor chip using the mask.

2. The method of claim 1, wherein the performing of PPC includes performing PPC on the layout pattern using machine learning.

3. The method of claim 1, wherein calculating the metric includes predicting an After Cleaning Inspection (ACI) Critical Dimension (CD) (ACI-CD) using the machine learning.

4. The method of claim 1, wherein calculating the metric includes calculating variation in an After Cleaning Inspection (ACI) Critical Dimension (CD) (ACI-CD) in relation to variation in an After Development Inspection (ADI) CD (ADI-CD).

5. The method of claim 1, wherein calculating the metric includes calculating variation in an After Cleaning Inspection (ACI) Critical Dimension (CD) (ACI-CD) in relation to an etch loading variation.

6. The method of claim 1, wherein calculating the metric includes calculating variation in an After Cleaning Inspection (ACI) Critical Dimension (CD) (ACI-CD) in relation to variation in a vertical structure.

7. The method of claim 1, wherein calculating the metric includes detecting a weak pattern in the layout pattern according to an amount of variation between an After Development Inspection (ADI) Critical Dimension (CD) and an After Clean Inspection (ACI) CD, etch load susceptibility, or vertical susceptibility.

8. The method of claim 1, wherein the performing of PPC further includes performing After Development Inspection (ADI) and After Cleaning Inspection (ACI) monitoring a weak pattern in accordance with results obtained by performing of PPC.

9. The method of claim 1, wherein the performing of PPC includes:
   predicting an After-Cleaning Inspection (ACI) Critical Dimension (CD) as varied by etching; and
   correcting an After Development Inspection (ADI) CD.

10. The method of claim 1, wherein the manufacturing of the mask includes merging High Aspect Ratio Contact (HARC) layers into a single mask.

11. A method of manufacturing a semiconductor chip, comprising:
   performing Process Proximity Correction (PPC) on a layout using a first machine learning model to generate a PPC layout pattern; and
   verifying the PPC layout pattern,
   wherein the verifying of the PPC layout pattern includes:
      calculating an After Cleaning Inspection (ACI) Critical Dimension (CD) (ACI-CD) using a second machine learning model; and
      detecting a weak pattern in the PPC layout pattern in relation to at least one of vertical structure susceptibility, an After Development Inspection (ADI) CD (ADI-CD) variation, and etch loading susceptibility.

12. The method of claim 11, wherein the performing of PPC includes:
   predicting an ACI image using the PPC layout pattern;
   determining whether the predicted ACI image falls within an acceptable error range; and
   adjusting the PPC layout pattern upon determining that the predicted ACI image does not fall within the acceptable error range.

13. The method of claim 11, wherein each of the first machine learning model and the second machine learning model uses deep learning.

14. The method of claim 11, further comprising:
   monitoring the detected weak pattern.

15. The method of claim 11, wherein the calculating of the ACI-CD includes calculating the ACI-CD for all contacts in a full-chip using the second machine learning model.

16. A computing device comprising:
   a memory device configured to store a Process Proximity Correction Rule Check (PRC) tool; and
   at least one processor configured to execute the PRC tool,
   wherein the PRC tool is configured to calculate an After Cleaning Inspection (ACI) Critical Dimension (CD) (ACI-CD) using machine learning, and detect a weak pattern in a Process Proximity Correction (PPC) layout pattern using the ACI-CD.

17. The computing device of claim 16, wherein the PRC tool is further configured to detect the weak pattern in relation to variation in an After Development Inspection (ADI) CD (ADI-CD).

18. The computing device of claim 16, wherein the PRC tool is further configured to detect the weak pattern in relation to variation in the ACI-CD in relation to etch loading variation.

19. The computing device of claim 16, wherein the PRC tool is further configured to detect the weak pattern by an amount of variation in the ACI-CD in relation to a vertical structure variation.

20. The computing device of claim 16, wherein the memory device is further configured to store a process proximity correction (PPC) tool, and the at least one processor is further configured to executes the PPC tool.

\* \* \* \* \*